United States Patent [19]

Looker

[11] Patent Number: 5,022,992
[45] Date of Patent: Jun. 11, 1991

[54] APPARATUS FOR SEPARATING SLUDGE

[76] Inventor: Jack D. Looker, 84 Grand Ct., Highland, Mich. 48031

[21] Appl. No.: 478,923

[22] Filed: Feb. 12, 1990

[51] Int. Cl.⁵ .............................................. B01D 17/28
[52] U.S. Cl. .................................... 210/521; 210/523; 210/525; 210/532.1; 210/540
[58] Field of Search ............... 210/523, 525, 521, 519, 210/522, 532.1, 537, 538, 540, 243, 195.1, 143

[56] References Cited

U.S. PATENT DOCUMENTS

| | | | |
|---|---|---|---|
| 3,121,680 | 2/1964 | Ciabattari | 210/525 X |
| 3,219,190 | 11/1965 | Thune | 210/523 X |
| 3,741,399 | 6/1973 | Peterson | 210/525 |
| 4,432,870 | 2/1984 | Russell | 210/143 |
| 4,470,905 | 9/1984 | Pangburn et al. | 210/243 X |
| 4,610,785 | 9/1986 | Russell | 210/195.1 |

Primary Examiner—Richard L. Chiesa
Attorney, Agent, or Firm—Brooks & Kushman

[57] ABSTRACT

A sludge removal apparatus (10) disclosed includes a tank (12) having bottom (14), side walls (16,18) and first and second end walls (20,22) for receiving and holding an immiscible mixture of fluid and floatable sludge. A skimmer (32) mounted on the tank (12) is movable in a sequential path for skimming the sludge from the surface of the mixture. The tank bottom (14) and side walls (16,18) are sloped so that any settling particles are reintroduced into a high velocity fluid stream communicated into the tank bottom (14) for further processing. A guide portion (28) guides skimmer (32) into the sludge immediately in front of a diverter (26) in the direction of circulation within the tank (12) to eliminate regions of stagnated sludge on the mixture.

14 Claims, 2 Drawing Sheets

APPARATUS FOR SEPARATING SLUDGE

TECHNICAL FIELD

This invention relates to a paint sludge removal system and, more particularly, to apparatus for separating agglomerated paint particles or sludge from a water carrier.

BACKGROUND ART

Production painting operations generally utilize a paint spray booth designed to contain paint overspray. In conventional paint spray booths, water flowing along a wall of the paint booth forms a backdrop against which the water entrains oversprayed particles from the airflow within the paint booth. This mixture of water and paint particles cannot be disposed of pursuant to environmental regulations and there is a need to conserve water.

Therefore, various apparatus have been conceived in which paint particles within the water are agglomerated in a separating tank by the introduction of chemicals to the water and paint particle mixture. Agglomerated paint particles rise and float on the surface of the water in the separating tank, forming a sludge thereon which is periodically skimmed off, collected and disposed of. Treated water, with the paint particles removed, is recirculated to the paint booth.

Three such apparatus are disclosed in U.S. Pat. Nos. 4,610,785; 4,470,905; and 4,432,870.

U.S. Pat. No. 4,610,785 discloses a sludge separation tank divided into two regions and having a baffle disposed in the separation tank adjacent the outlet of the pump for directing sludge entering the separation tank toward the surface of the liquid.

U.S. Pat. No. 4,470,905 discloses a sludge separation tank having an inlet opening in the bottom of the tank directing a mixture of paint particles in the water carrier upwardly and a vertical upstanding first wall dividing the tank into an inlet and an outlet section.

U.S. Pat. No. 4,432,870 discloses a sludge separation tank having a water inlet at water level and a water return opening below the surface level. The tank includes liquid circulating jets for recirculating paint particles settling on the tank bottom.

All of the aforesaid apparatus include restrictive flow regions within the separation tanks that inhibit the efficiency of said apparatus allowing some paint particles to settle to the bottom of the tanks. Furthermore, said apparatus create regions of stagnated flow or dead spots on the surface of the water whereby periodic manual sludge removal or cleaning of the tank is required.

DISCLOSURE OF THE INVENTION

An object of the present invention is to provide a paint sludge removal apparatus having a simpler tank construction that allows for efficient fluid circulation within the tank.

Another object of the invention is to provide a paint sludge removal apparatus that provides for constant movement of agglomerated paint particles on the surface of the mixture of water and paint particles.

Another object of the invention is to provide a paint sludge removal apparatus in which any settling paint particles are reintroduced into the fluid stream within the tank for further processing.

A further object of the present invention is to provide a paint sludge removal apparatus which, when constructed in accordance with the present invention, includes a tank having a bottom, side and first and second end walls for receiving and holding an immiscible mixture of liquid and floatable sludge. The first end wall is upwardly inclined in one direction and the tank bottom is upwardly inclined in the opposite direction between the first and second end walls and configured in a trough shape. The tank has an inlet beneath the first end wall. The inlet communicates with the tank bottom for supplying the mixture into the tank and flows along the inclined bottom toward the second end wall. A diverter projecting from the side and end wall in the path of the mixture being supplied, directs the flow of the mixture upwardly in said one direction during which floatable sludge rises to the surface of the mixture being held in the tank. The floatable sludge forms a mat of sludge on the liquid in the tank. The diverter includes a guide portion above the surface of the mixture.

Within the foregoing object, the apparatus further includes an inclined ramp which extends through the mat of sludge after which the sludge is skimmed. A skimmer is mounted on the tank and is movable in a sequential path which includes the surface of the mixture, a portion of the ramp above the surface and the guide portion of the diverter for skimming the sludge from the surface, moving the skimmed sludge up the inclined ramp and returning to the surface along the guide portion.

Within the foregoing object, the apparatus further includes a baffle mounted below the inclined ramp and extending generally vertically into the tank to a position spaced from the first end wall forming with the inclined ramp and first end wall an outlet chamber whereby the flow is directed downwardly to allow liquid without the paint particles to escape from the tank. A collector, in communication with the outlet chamber receives said liquid for recirculation.

In a preferred embodiment of the invention, the paint sludge removal apparatus further includes a separator mounted above the inlet and extending generally parallel to the tank bottom for separating the incoming flow of the mixture from circulating fluid within the tank.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
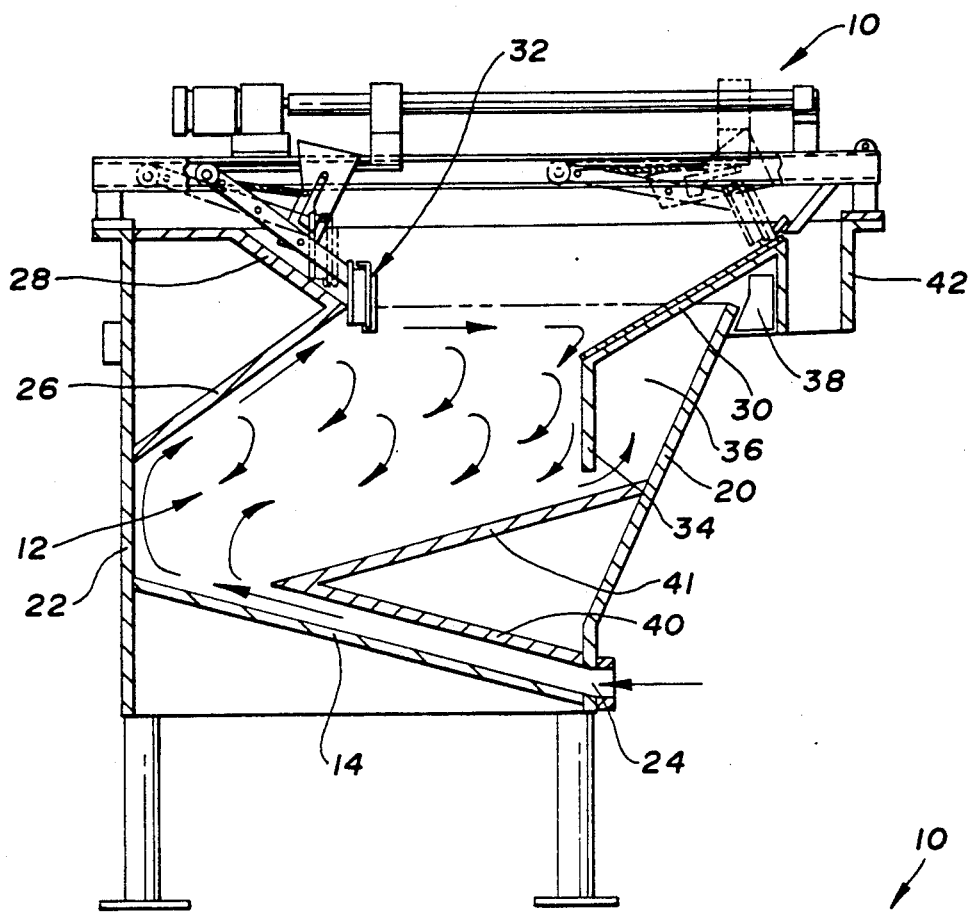
FIG. 1 is sectional view, partly in elevation of a sludge removal apparatus constructed in accordance with the present invention and illustrating the direction of fluid circulation within a tank.

With reference to FIG. 1 of the drawings, a sludge removal apparatus constructed in accordance with the present invention is generally indicated by reference numeral 10 and is used for removing less dense floatable sludge from a carrier fluid. As is more fully hereinafter described, the sludge removal system 10 is used for removing agglomerated paint particles from circulating water which has been used for cleaning a paint spray booth (not shown) in a production paint spraying operation.

Figure 2:
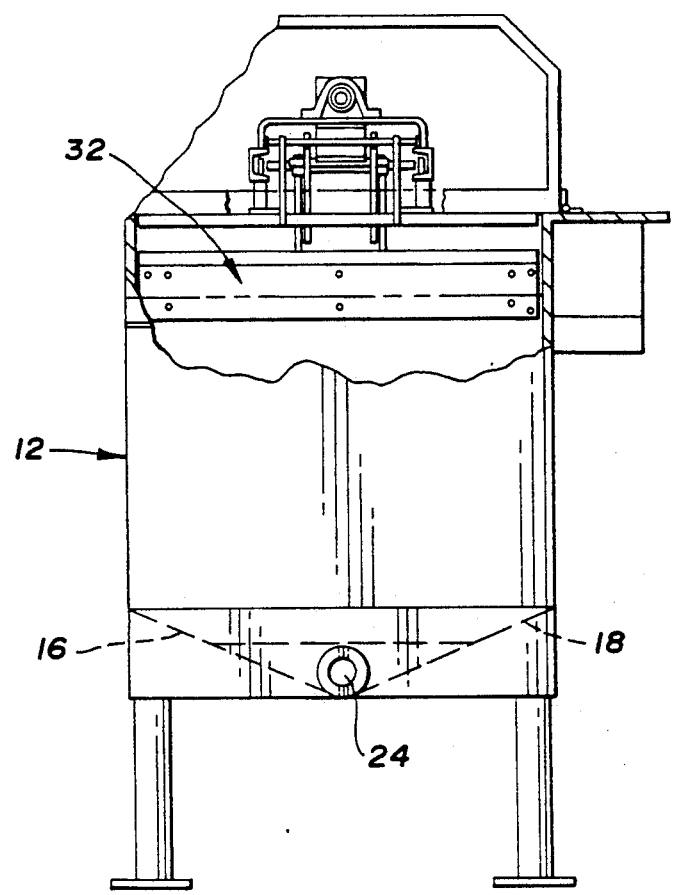
FIG. 2 is a fragmentary end elevational view, partly cut away, of the sludge removal apparatus of FIG. 1.

As shown in FIGS. 1 and 2 of the drawings, the sludge removal apparatus 10 includes a tank 12, having a bottom 14, side walls 16, 18 and first and second end walls 20,22 for receiving and holding an immiscible mixture of fluid or liquid, hereinafter water, paint particles carried by the water and a chemical additive that causes the paint particles to agglomerate. The first end wall 20 is upwardly inclined in one direction. The tank bottom 14 is upwardly inclined in the opposite direction between the first and second end walls 20,22 and configured in a trough shape with side walls 16,18. Tank 12 has an inlet 24 beneath the first end wall 20 communicating with tank bottom 14 for receiving from a recirculating pump (not shown) and supplying the mixture of water, paint particles and chemicals into tank 12 at a high velocity flow rate along the inclined bottom 14 toward the second end wall 22. Throughout the drawing figures, the general direction of flow through tank 12 is indicated by arrows.

With continued references to FIGS. 1 and 2 of the drawings, a diverter 26 projects from second end wall 22 in the path of the mixture being supplied and directs the flow of the mixture upwardly in said one direction during which floatable sludge, formed from paint particles agglomerated by the chemical additive, rises to the surface of the mixture being held in tank 12 forming a mat of sludge on the mixture. Diverter 26 includes a guide portion 28 extending above the surface of the mixture. Toward the first end wall 20, an inclined ramp 30 extends from above the surface of the mixture through the mat of sludge. This mat of sludge is skimmed from the surface of the mixture and moved onto inclined ramp 30.

Figure 3:
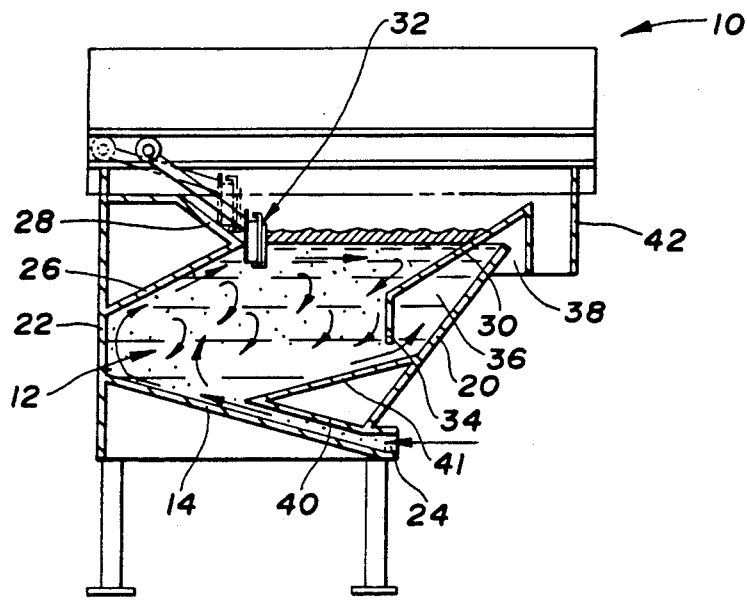
FIG. 3 is a sectional view, partly in elevation of the sludge removal apparatus illustrating a skimmer in one position of a sequential path for skimming sludge off the surface of the fluid in the tank.
Figure 4:
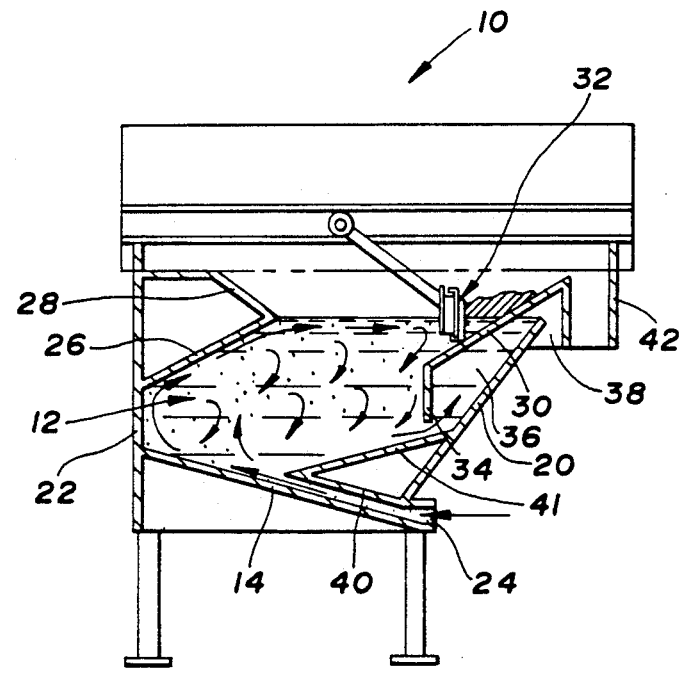
FIG. 4 is a sectional view, partly in elevation illustrating the skimmer moved to another position moving sludge off the surface of the fluid.
Figure 5:
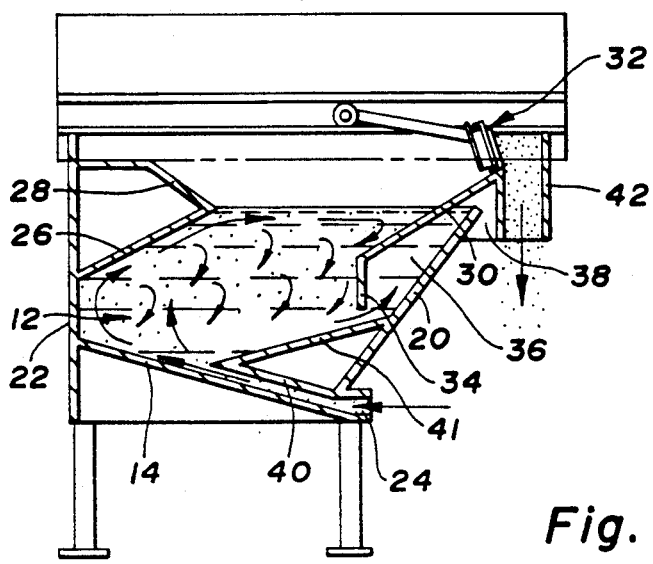
FIG. 5 is a sectional view, partly in elevation of the sludge removal apparatus illustrating the skimmer in an extended position along its sequential path disposing of the sludge through a chute.

A skimmer 32, for skimming the mat of sludge off the surface, is mounted on tank 12 and movable in a sequential path, illustrated in FIGS. 3-5. That sequential path includes travel along the guide portion 28 of diverter 26, the surface of the mixture in the direction of liquid circulation in the tank 12 along the surface and the inclined ramp 30. Skimmer 32 returns above the surface to the guide portion 28 to repeat its sequence.

A baffle 34, mounted below the inclined ramp 30 and extending generally vertically into tank 12 to a position spaced from the first end wall 20, forms with the inclined ramp 30 and first end wall 20 an outlet chamber 36. Baffle 34 deflects the flow of water, with the agglomerated paint particles removed downwardly and thereby allows water without the sludge to escape from the tank as the mixture level in the tank remains constant. A collector 38 communicates with outlet chamber 36 for receiving the liquid for recirculation to the paint spray booth.

In the preferred embodiment of the invention illustrated in FIGS. 1 through 5, a separator 40 is mounted above inlet 24 and extends generally parallel to the tank bottom 14 to separate the incoming flow of the mixture from established circulation occurring within tank 12. Separator 40 includes a top plate 41 inclined downwardly toward tank bottom 14 generally in the range of between 10 and 20. from horizontal. Most preferably, top plate 41 is inclined at 15°. Second end wall 22 extends generally in a vertical direction. The tank bottom 14 and side walls 16,18 are also inclined generally in the range of between 10 and 20° from horizontal. Most preferably, tank bottom 12 and side walls 16,18 are also inclined at 15°. This design causes paint particles, that do not initially agglomerate and have a tendency to settle toward the bottom of the mixture, to gravitate down the sides 16,18 of the tank 12 and top plate 41 and reenter the high velocity fluid stream entering through inlet 24.

Operation of the Invention

FIGS. 3-5 illustrate the operation of the sludge removal apparatus 10.

Initially, the water, suspended paint particles and agglomerating chemicals enter through inlet 24 under water pressure from recirculation pumps (not shown). This mixture flows upwardly along tank bottom 14 for generally 40% of the length of the bottom at high velocity and laminar flow. This mixture travels to second end wall 22 where it is turned upwardly and is then directed along diverter 26, which causes the mixture to become turbulent.

It is at this time when the agglomerating chemical in the mixture is reacting with the paint particles to form paint sludge composed of agglomerated paint particles. This paint sludge has a natural tendency to rise to the surface of the water and coagulate into a mat of sludge on the surface. The water in tank 12 continues its generally turbulent flow within the tank with the conglomerated paint particles continually rising and the water maintaining its level within the tank by flowing under baffle 34 and outwardly over first end wall 20.

Any paint particles that do not agglomerate have a tendency to settle toward the bottom of the mixture. The slope of the sides 16,18 and top plate 41 cause these particles to gravitate toward the center of the trough-shaped bottom 14 of the tank 12, where the paint particles reenter the high velocity fluid stream being supplied through inlet 24. Thereby the paint particles are further exposed to the agglomerating chemicals to form floatable paint sludge. The trough-configured tank bottom 14 therefore forces all settling paint particles back into the higher velocity mixture flow at all times, thereby maximizing the efficiency of the tank 12 and the chemical action.

With reference to FIG. 3, and the initial and subsequent path of skimmer 32, skimmer 32 travels downwardly along inclined ramp 30 to the surface of the mixture and is then displaced laterally to skim the sludge off the mixture from the guide portion 28 toward the inclined ramp 30. The guide portion 28 above the diverter 26, guides the skimmer 32 into the surface of the mixture immediately in front of the diverter 26 and in the direction of circulation within the tank to eliminate the possibility of any stagnated regions of sludge on the surface of the mixture behind the skimmer 32.

FIG. 4 of the drawings illustrates the pushing of the skimmer 32 along the surface of the mixture toward the inclined ramp 30. In FIG. 5 it can be seen that the skimmer 32 pushes the skimmed sludge up the inclined ramp 30, which temrinates into a discharge chute 42. The skimmer 32 is then actuated to be retuned to the guide portion 28 of the diverter 26 and the sequence is repeated continually during the operation of the sludge removal apparatus 10.

While the best mode for carrying out the invention has been described in detail, those familiar with the art to which this invention relates will recognize alternative ways for practicing the invention as defined by the following claims.

What is claimed is:

1. Sludge removal apparatus for removing floatable sludge from a carrier fluid comprising:
   a tank having a bottom, side and first and second end walls for receiving and holding an immiscible mixture of fluid an floatable sludge; said first end wall being upwardly inclined in one direction and said tank bottom being upwardly inclined in the opposite direction between said first and second end walls and configured in a trough shape; said tank having an inlet beneath said first end wall and communicating with said tank bottom for receiving the mixture into said tank in a flow along said inclined bottom toward said second end wall;
   a diverter projecting from said second end wall and having one portion in the path of the mixture being received for directing the flow of the mixture upwardly in said one direction during which floatable sludge rises to the surface of the mixture being held in said tank to form a mat of sludge on said surface; said diverter including a guide portion above said surface;
   an inclined ramp extending through the surface where the mat of sludge is formed for receiving the sludge to be skimmed;
   a skimmer mounted on said tank and movable in a sequential path which includes the surface of said mixture, a portion of said ramp above said surface and the guide portion of said diverter for skimming the sludge from said surface, moving said skimmed sludge up said inclined ramp out of said mixture and returning to said surface along said guide portion;
   a baffle mounted below said inclined ramp and extending generally vertically into said tank to a position spaced from said first end wall to form with said inclined ramp and said first end wall an outlet chamber for receiving fluid with the sludge removed; and
   a collector communicating with said outlet chamber for receiving said fluid with the sludge removed for recirculation of said fluid to said inlet.

2. Apparatus as in claim 1 further including a separator mounted above said inlet and extending generally parallel to said tank bottom, said separator including a top plate inclined downwardly from said first end wall toward said tank bottom, said separator separating the incoming flow of the mixture from circulating fluid within said tank.

3. Apparatus as in claim 2 wherein said top plate is inclined generally in the range of between 10 and 20 degrees.

4. Apparatus as in claim 2 wherein said top plate is inclined at 15 degrees.

5. Apparatus as in claim 1 wherein said second end wall is vertical.

6. Apparatus as in claim 1 wherein said tank bottom is inclined generally in the range of between 10 and 20 degrees.

7. Apparatus as in claim 1 wherein said tank bottom is inclined at 15 degrees.

8. Apparatus as in claim 1 wherein said side wall are upwardly inclined from said tank bottom.

9. Apparatus as in claim 1 wherein said side walls are inclined generally in the range of between 10 and 20 degrees.

10. Apparatus as in claim 1 wherein said side walls are inclined at 15 degrees.

11. Apparatus as in claim 1 wherein said skimmer aims sludge in the direction of fluid flow at the surface of the liquid in the tank.

12. Sludge removal apparatus for removing floatable sludge from a carrier fluid comprising:
    a tank having a bottom, said and first and second end walls for receiving and holding an immiscible mixture of fluid and floatable sludge; said first end wall being upwardly inclined in one direction and said tank bottom being upwardly inclined in the opposite direction between said first and second end walls and configured in a trough shape; said tank having an inlet beneath said first end wall and communicating with said tank bottom for receiving the mixture into said tank in a flow along said inclined bottom toward said second end wall;
    a diverter projecting from said second end wall and having one portion in the path of the mixture being received for directing the flow of the mixture upwardly in said one direction during which floatable sludge rises to the surface of the mixture being held in said tank to form a mat of sludge on said surface; said diverter including a guide portion above said surface;
    an inclined ramp extending through the surface where the mat of sludge is formed for receiving the sludge to be skimmed;
    a skimmer mounted on aid tank and movable in a sequential path which includes the surface of said mixture between said guide portion sand said inclined ramp, a portion of said ramp above said surface and the guide portion of said diverter for skimming the sludge from said surface, moving said skimmer sludge up said inclined ramp out of said mixture and returning to said surface along said guide portion;
    a baffle mounted below said inclined ramp and extending generally vertically into said tank to a position spaced from said first end wall to form with said inclined ramp and said first end wall an outlet chamber for receiving fluid with the sludge removed;
    a separator mounted above said inlet and extending generally parallel to said tank bottom, said separator including a top plate sloping downwardly from said first end wall toward said tank bottom and spaced from said baffle to provide fluid access to said outlet chamber, said separator separating the incoming flow of the mixture from circulating fluid within said tank; and
    a collector communicating with said outlet chamber for receiving fluid with the sludge removed for recirculation of said fluid to said inlet.

13. Apparatus as in claim 12 wherein said bottom has a length L.

14. Apparatus as in claim 13 wherein said separator is generally greater than 40% of length L.

* * * * *